G. H. LEE.
THERMOMETER HANGER FOR INCUBATORS.
APPLICATION FILED JUNE 3, 1908.

932,299.  Patented Aug. 24, 1909.

WITNESSES
J. A. Brophy
F. D. Ammen

INVENTOR
George H. Lee
BY Munn & Co.
ATTORNEYS

UNITED STATES PATENT OFFICE.

GEORGE HOWARD LEE, OF OMAHA, NEBRASKA.

THERMOMETER-HANGER FOR INCUBATORS.

932,299.  Specification of Letters Patent.  Patented Aug. 24, 1909.

Application filed June 3, 1908. Serial No. 436,409.

*To all whom it may concern:*

Be it known that I, GEORGE H. LEE, a citizen of the United States, and a resident of Omaha, in the county of Douglas and State of Nebraska, have invented a new and Improved Thermometer-Hanger for Incubators, of which the following is a full, clear, and exact description.

This invention relates to thermometers, and especially to thermometers when used in incubators or in similar situations where it is desirable to have the bulb of the thermometer supported adjustably so that the level of the bulb may be regulated and placed at any point desired.

The object of the invention is to produce a thermometer of this kind having a hanging device or hanger of simple construction which will permit of the adjustability of the bulb end of the thermometer as suggested.

The invention consists in the construction and combination of parts to be more fully described hereinafter and particularly set forth in the claims.

Reference is to be had to the accompanying drawings forming a part of this specification in which similar characters of reference indicate corresponding parts in both the figures.

Figure 1:
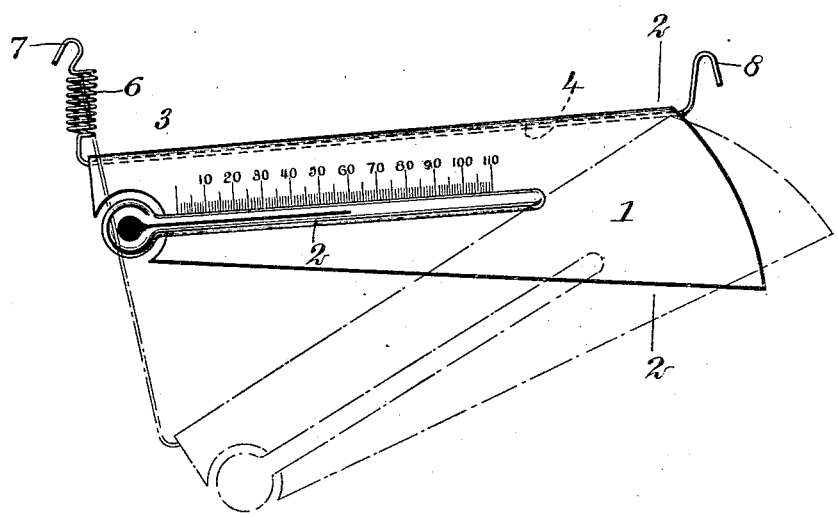
Figure 2:
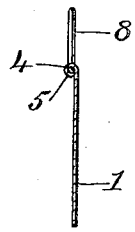

Figure 1 is a front elevation of a thermometer provided with my invention, the dotted lines in this view indicating the manner in which the thermometer may be adjusted so that its bulb will be at the lowest possible level; and Fig. 2 is a vertical section on the line 2—2 of Fig. 1.

Referring more particularly to the parts, 1 represents the shield or face plate of the thermometer, which is a metal plate of simple form, to the forward face of which a thermometer 2 is attached. In applying my invention, I provide a hanger 3 which is preferably formed of soft wire, or similar material. This hanger comprises a rod 4 which extends longitudinally of the face plate 1, and is attached by crimping the upper edge of the face plate over the upper edge of the rod to form a retaining sleeve 5, as indicated in Fig. 2. At the end of the thermometer adjacent to the bulb, the wire which forms the rod 4 is bent into a helical coil 6, and above this coil the wire is bent into a hook 7. At the opposite end of the thermometer, the end of the rod projects upwardly and is bent to form a hook 8, as shown.

In mounting the thermometer in the incubator, or at any point where it is to be used, fastening devices are provided, over which the hooks 7 and 8 engage so as to support the thermometer. When the thermometer is hung as suggested, if the bulb thereof is at too high a level, the coil 6 may be extended as much as desired so as to bring the bulb to the proper level. In this connection it should be distinctly understood that the coil 6 is in no sense resilient, and that it readily maintains itself with its separate coils in the position in which they are left. It should be understood, however, that the material of which the coil is formed should be stiff enough to prevent the weight of the thermometer from extending the coil.

While the coil 6 has been described as a spiral, it is evident that the coils may be considered in a broad sense as being convolutions formed in the wire. If it is desired to hold the thermometer bulb at the lowest possible level, this can be done by extending the coil 6 until it becomes straight, as indicated by the dotted lines. It will be evident that with a thermometer-hanger constructed as described, the height of the thermometer bulb may be quickly adjusted without changing the position of the fastening devices by which the hanger is attached, and furthermore it will be clear that no particular care need be exercised in placing the fastening devices in position.

It is important that the thermometer in an incubator should have its bulb supported on a level with the upper side of the eggs, in order to indicate the correct hatching temperature. Eggs from different breeds vary greatly in size and duck and goose eggs are of course much larger than hen eggs. The thermometer-hanger described is very useful for this reason, as it enables the bulb to be adjusted quickly and accurately to the proper level to suit the eggs of each hatch.

Having thus described my invention, I claim as new and desire to secure by Letters Patent,—

1. A thermometer having means for supporting the same in a substantially fixed position at one point, and a non-resilient member supporting the said thermometer at another point and having convolutions enabling said member to be extended so as to raise or lower the level of the thermometer bulb.

2. A thermometer having a hook supporting one end thereof in a substantially fixed position, and a non-resilient member supporting the opposite end of said thermometer and having convolutions enabling said member to be extended so as to raise or lower the level of the thermometer bulb.

3. A thermometer having a face plate, a hanger attached to said face plate having a hook at one end thereof projecting from said face plate and having a coil, and a hook formed at the opposite end, said coil being formed of non-resilient material whereby said coil may be extended to adjust the height of the thermometer bulb.

In testimony whereof I have signed my name to this specification in the presence of two subscribing witnesses.

GEORGE HOWARD LEE.

Witnesses:
F. E. COATSWORTH,
R. D. JOHNSTON.